(12) United States Patent
Rickstrom et al.

(10) Patent No.: US 9,645,682 B2
(45) Date of Patent: May 9, 2017

(54) METHOD, SYSTEM AND APPARATUS FOR IDENTIFYING AN OBJECT

(71) Applicant: Frozenbyte Oy, Helsinki (FI)

(72) Inventors: Tero Rickstrom, Lahti (FI); Lauri Hyvarinen, Helsinki (FI); Tuukka Pensala, Helsinki (FI); Jukka Kokkonen, Espoo (FI); Joel Kinnunen, Helsinki (FI)

(73) Assignee: FROZENBYTE OY, Helsinki (FI)

( * ) Notice: Subject to any disclaimer, the term of this patent is extended or adjusted under 35 U.S.C. 154(b) by 368 days.

(21) Appl. No.: 13/903,148

(22) Filed: May 28, 2013

(65) Prior Publication Data

US 2013/0314375 A1 Nov. 28, 2013

Related U.S. Application Data

(60) Provisional application No. 61/653,608, filed on May 31, 2012.

(30) Foreign Application Priority Data

May 28, 2012 (FI) .................................... 20125566

(51) Int. Cl.
*G06F 3/044* (2006.01)
*G06F 3/03* (2006.01)
(52) U.S. Cl.
CPC ............... *G06F 3/044* (2013.01); *G06F 3/03* (2013.01)
(58) Field of Classification Search
CPC ...................................................... G06K 7/081
See application file for complete search history.

(56) References Cited

U.S. PATENT DOCUMENTS

| 5,471,040 | A | * | 11/1995 | May ................................ 235/451 |
| 2009/0207150 | A1 | * | 8/2009 | Obi et al. ........................ 345/174 |
| 2010/0045627 | A1 | | 2/2010 | Kennedy |
| 2010/0149119 | A1 | | 6/2010 | Homma et al. |
| 2010/0315102 | A1 | * | 12/2010 | Portmann ....................... 324/680 |
| 2011/0227871 | A1 | * | 9/2011 | Cannon .......................... 345/174 |
| 2011/0253789 | A1 | | 10/2011 | Thiele et al. |
| 2012/0125993 | A1 | | 5/2012 | Thiele et al. |

OTHER PUBLICATIONS

Finnish Search Report dated Mar. 22, 2013, corresponding to the Foreign Priority Application No. 20125566.

* cited by examiner

*Primary Examiner* — Seokyun Moon
*Assistant Examiner* — Peijie Shen
(74) *Attorney, Agent, or Firm* — Young & Thompson

(57) ABSTRACT

A method includes receiving by a capacitive touch screen an object code pattern being associated with an object, the object code pattern including at least one conductive part, so that, upon receiving, electric field changes within an area of the capacitive touch screen that interacts with the at least one conductive part. The method further includes detecting the changes in the electric field to produce a virtual object code including an identifier code relating to the object, recognizing the object by comparing the identifier code to a list of identifier codes, providing application data based on the object, and performing using the capacitive touch screen at least one application based on the application data. In addition, a system, an apparatus and a computer program related to the method are presented.

14 Claims, 4 Drawing Sheets

METHOD, SYSTEM AND APPARATUS FOR IDENTIFYING AN OBJECT

TECHNICAL FIELD OF THE INVENTION

The present invention relates generally to detecting information about objects. More particularly, object information is detected and two-way communication based on said information is provided through interaction between the object and the touch screen device.

BACKGROUND OF THE INVENTION

Optical code patterns comprising identifier and application data are used to detect information about objects. By pointing the camera of the mobile phone at the optical code pattern and clicking the shutter a picture of the optical code pattern is taken. Then the optical code pattern is read and the object associated with the optical code pattern is recognized to get information relating to said object. Some application data relating to the object will be available after detecting the optical code pattern. Object information and application data relating to the object may be updated by updating the optical code pattern concerned.

However, photographing the optical code pattern and processing the picture data are both individual operational process steps and therefore laborious for the user. Both steps also require that the optical code pattern should be directly adjacent to the reading device. All this will slow down the detection process.

Therefore, there is a need for a fast and easy way to provide object identification and object related information based on the object identification.

SUMMARY OF THE INVENTION

It is an objective of the present invention to provide fast and easy detection process in order to identify the object and to provide information relating to the identified object. The objective of the invention is achieved by providing a capacitive touch screen device to receive a touch of an object code pattern being associated with the object, or vice versa. The touch can be either direct touch or a touch through a substance having sufficiently high electric permittivity. This provides the object code pattern to interact with the capacitive touch screen. This requires only one operational process step and the need for taking a picture of the optical code pattern and processing the picture is omitted.

The invention is characterized by what is presented in the independent claims.

In accordance with a first aspect of the invention there is provided a method which comprises receiving by a capacitive touch screen an object code pattern which is associated with an object. The object code pattern comprises at least one conductive part, so that, upon receiving by the capacitive touch screen, electric field changes within an area of the capacitive touch screen that interacts with said at least one conductive part. The method also comprises detecting the changes in the electric field to produce a virtual object code comprising an identifier code relating to the object. The method also comprises recognizing the object by comparing the identifier code to a list of identifier codes. The method also comprises retrieving/providing application data based on the object and performing, using the touch screen, at least one application based on the application data.

In accordance with a second aspect of the invention there is provided an apparatus which comprises a processor and a memory that comprises a computer program, where the memory and the computer program together with the processor cause the apparatus to perform the method of any of the method claims.

In accordance with a third aspect of the invention there is provided a computer program comprising program code means which are adapted to perform the method of any of the method claims, when said program is run on a computer.

In accordance with a fourth aspect of the invention there is provided an object code pattern for an object which object code pattern comprises at least one conductive part adapted to interact with the apparatus that performs the method of any of the method claims.

In accordance with a fifth aspect of the invention there is provided an arrangement which comprises an apparatus comprising a processor and a memory that comprises a computer program, where the memory and the computer program together with the processor cause the apparatus to perform the method of any of the method claims. The arrangement also comprises an object that comprises the object code pattern being adapted to interact with the apparatus that performs the method of any of the method claims.

Embodiments of the invention are presented in dependent claims.

An advantage of the invention is to provide an easy way to identify a physical object by placing the object code pattern being associated with the object on or above the capacitive touch screen of the electronic device so that the object code pattern interacts with the capacitive touch screen. The object code pattern being associated with the object comprises individual identity information based on what each of the objects can be identified.

A further advantage of the invention is that other data relating to the identified physical object can be transmitted when the object code pattern interacts with the capacitive touch screen. This other data can be application data, additional data or any other data that allows the capacitive touch screen device or the object to perform functions or present information relating to the identified object or retrieve and use further information from internal or external databases where such information is maintained for the identified object. For example, some data is retrieved from an internal database and further data is retrieved form an external database or a database server. If the physical object comprises receiving means it may receive data during the interaction between the object code pattern of the identified object and the capacitive touch screen of the electronic device.

A further advantage of the invention is that the pulsed signal can be coupled to the object code pattern which increases a lot of functionality to be transmitted during the interaction between the object code pattern of the identified object and the capacitive touch screen of the electronic device. By coupling the pulsed signal production and the object code pattern together the result will be a time-variable object code pattern. The time-variable object code patter can be used to transmit much more other data than static identifier.

A further advantage of the invention is that the object code pattern can be freely placed on the touch screen in any position within the dimensions of the capacitive touch screen so that the conductive part of the object code pattern touches directly the capacitive touch screen or indirectly through a protective substance having sufficiently high electric permittivity. Placing the object code pattern on the touch screen includes touching directly or indirectly the touch screen with it, moving it on directly or indirectly the touch screen or touching/moving the touch screen towards/on the object code pattern. It is possible but not necessary to make touching and/or moving more effective by slightly pressing the touch screen or the protective layer on the touch screen.

A further advantage of the invention is that the object code pattern comprising at least one conductive part can be read by any capacitive touch screen having any display resolution.

A further advantage of the invention is that it provides a safe identification of the object. It is difficult to reproduce the object code pattern. In case the pulsed signal is coupled to the object code pattern it would be extremely difficult to reproduce it, for example, by tapping finger or other item.

BRIEF DESCRIPTION OF THE DRAWINGS

Example embodiments of the present invention will be described in detail below, by way of example only, with reference to the accompanying drawings, of which

DETAILED DESCRIPTION OF THE INVENTION

Figure 1A:
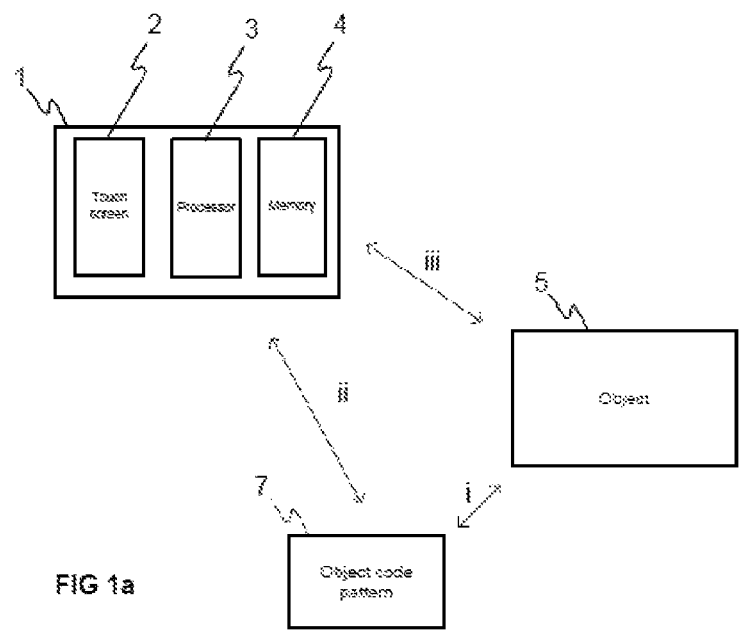
FIG. 1a depicts a block diagram of an example of an arrangement in which aspects of the disclosed embodiments may be applied.

FIG. 1a shows an arrangement according to an example of the invention. The arrangement comprises an object code pattern 7, an object 5 and an electronic apparatus 1 comprising at least a capacitive touch screen 2, a processor 3 and a memory 4. The memory 4 comprises a computer program, where the memory 4 and the computer program together with the processor 3 cause the apparatus 1 to perform operations.

The object code pattern 7 is associated with an object 5. The object code pattern 7 comprises at least one conductive part (as shown in FIGS. 2a-2c and 4a-4c). The object code pattern 7 comprises information including at least identity information relating to the object 5. The object code pattern 7 may also comprise other information that relates to the object 5 or is useful when providing information and performing functions, for example playing games relating to the object 5. For providing information relating to the object 5 the object code pattern 7 may comprise data that allows retrieve and exploit more information from the memory 4 and/or from external databases, e.g. Internet servers. The memory 4 and external databases are arranged to store a plurality of data items associated with operations.

The object 5 can be any tangible object or article for example toy, soft toy, collectable, accessory, book, newspaper, visiting card, advertisement, time table to name few. The object 5 may be any physical object to which the object code pattern 7 may be linked (arrow i in FIG. 1a) and preferably the object code pattern 7 is attached to the object 5. The object 5 and the object code pattern 7 are linked together so that, for example, the object code pattern 7 is attached to the object 5 e.g. by printing, gluing, sewing it to the object 5 or using adhesives to fix it to the object 5. Preferably, the object code pattern 7 is attached to the bottom of the object 5.

The object 5 comprising an object code pattern 7 is adapted to interact with the apparatus 1 that performs operations to be discussed later. For example, the capacitive touch screen 2 of the apparatus 1 is adapted to receive an object code pattern 7 being associated with the object 5, wherein the object code pattern 7 comprises at least one conductive part. Upon receiving the object code pattern 7 on the capacitive touch screen 2 electric field changes within an area of the capacitive touch screen 2 that interacts with the at least one conductive part.

Figure 1B:
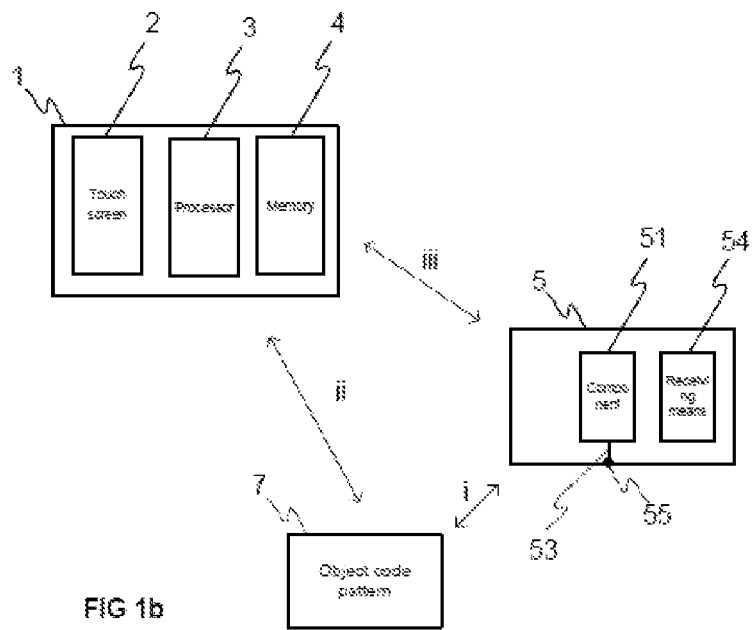
FIG. 1b depicts a block diagram of another example of an arrangement in which aspects of the disclosed embodiments may be applied.

In an arrangement according to an example of the invention, as shown in FIG. 1b, the object 5 comprises a component 51. In an example, the component 51 comprises an electronic circuit, preferably a transistor or other switching circuit, which is adapted to produce a time-variant pulsed signal to the object code pattern 7 being associated to the object 5. Variables relating to the pulsed signal can be programmed beforehand. The object 5 comprises an object connection point 55 which serves as an input/output of electric connections of the object 5. The component 51 is electrically connected to the object connection point 55 e.g. by a conductor 53.

In an arrangement according to an example of the invention, as shown in FIG. 1b, the object 5 comprises receiving means 54 such as a photodiode or other detector that is adapted to receive information based on changes in the capacitive touch screen 2 of the apparatus 1. In an example, the object 5 further comprises storing means adapted to store received information.

Arrows shown in FIGS. 1a and 1b represent links within the arrangement. Arrow (i) link depicts association between the object 5 and the object code pattern 7 and mostly it refers to attaching the object code pattern 7 to the object 5, as earlier described. Arrow link (ii) depicts interaction between the object code pattern 7 and the apparatus 1 when the capacitive touch screen 2 receives a touch of the object code pattern 7 or an approach of the object code pattern 7 within a suitable distance. The link (ii) can be two-way interaction. Arrow link (iii) depicts the apparatus 1 performing operations based on interactions via link (ii). Arrow link (iii) also depicts the object 5 performing operations based on link (ii).

Figure 2A:
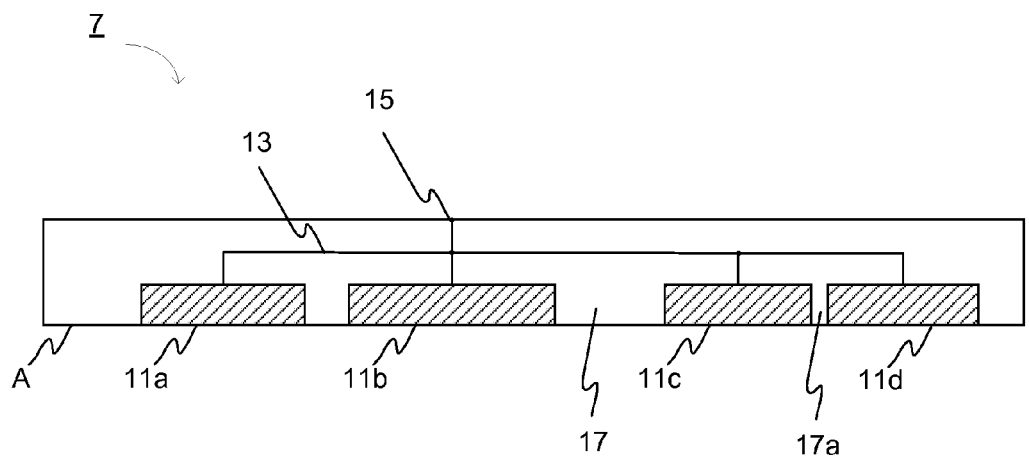
FIG. 2a depicts a cross-section diagram of an example of an object code pattern in which aspects of the disclosed embodiments may be applied.

FIG. 2a shows a cross-section diagram of an object code pattern 7 according to an example of the invention. The object code pattern 7 being associated with the object 5 comprises conductive parts 11a-11d. The surface A of the object code pattern 7 faces the capacitive touch screen 2 of the apparatus 1 when the capacitive touch screen 2 receives the object code pattern 7. The surface A of the object code pattern 7 further comprises a non-conductive part 17 that surrounds the conductive part 11a-11d. Each conductive part 11a-11d, including adjacent conductive parts 11c, 11d, is surrounded at least by a strip 17a of non-conductive part 17. Shape, size and number of conductive parts 11a-11d within the surface A of the object code pattern 7 are not limited. The conductive parts 11a-11d may be arranged to form a predetermined shape together with non-conductive part 17. For example, the surface A of the object code pattern 7 may form a grid of squares where conductive parts 11a-11d and non-conductive parts 17 are in the form of squares and each of the squares is surrounded by a strip 17a of non-conductive part 17. It can be freely predetermined which of the squares are conductive and which of them are non-conductive.

In an object code patter 7 according to an example embodiment of the invention depicted in FIG. 2a each of the conductive parts 11a-11d is electrically connected through the non-conductive part 17 to a conductive member which in this case is each other of the conductive parts 11a-11d. For example, the conductive part 11a is connected by the conductor 13 through the non-conductive part 17 to the conductive parts 11b-11d. In this example the conductor 13 is embedded in the conductive part 17. Exemplary the conductive parts 11a-11d may also be connected by the conductor 13 to another conductive member which is a connection point 15. The connection point 15 serves as an input/output of electric connections of the objective code pattern 7.

Figure 2B:
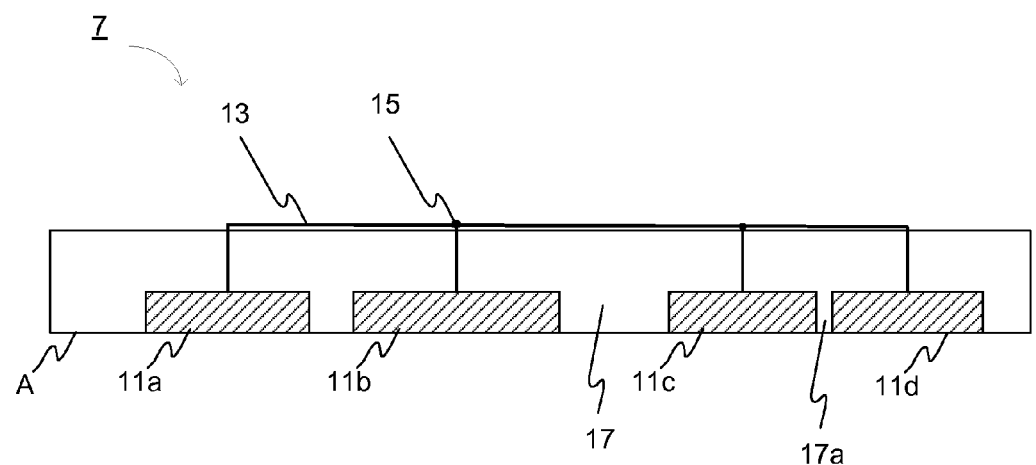
FIG. 2b depicts a cross-section diagram of another example of an object code pattern in which aspects of the disclosed embodiments may be applied.

FIG. 2b shows a cross-section diagram of the object code pattern 7 that is mainly similar to the object code pattern 7 of FIG. 2a. However, in this example the conductor 13 is partly embedded in the conductive part 17 and partly the conductor 13 is on the opposite surface of the object code pattern 7 than the surface A. In this example, the conductor 13 can be also connected to another conductive member namely the connection point 15 which serves as an input/output of electric connections of the objective code pattern 7.

Figure 2C:
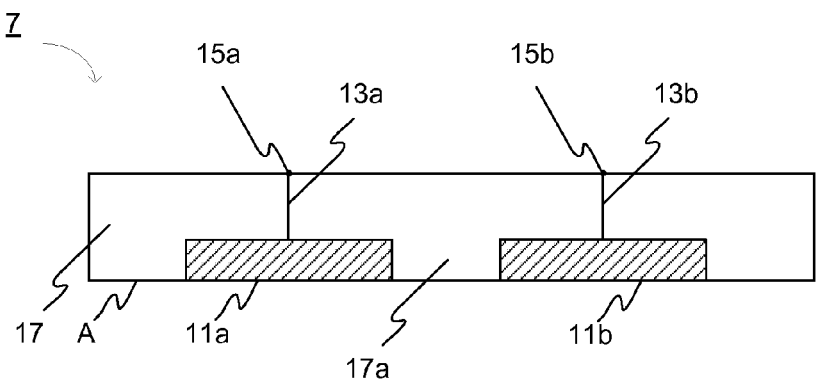
FIG. 2c depicts a cross-section diagram of still another example of an object code pattern in which aspects of the disclosed embodiments may be applied.

FIG. 2c shows an object code pattern 7 according to an example of the invention. The object code pattern 7 being associated with the object 5 comprises conductive parts 11a, 11b. Alternatively, the object code pattern 7 may comprise only one conductive part 11a or it may comprise any number of conductive parts 11a, 11b. The conductive part 11a, 11b is electrically connected through the non-conductive part 17 to the conductive member. The conductor 13a, 13b connects the conductive part 11a, 11b to the conductive member which in this case is the connection point 15a, 15b which serves as an input/output of electric connections of the object code pattern 7.

In an object code patter 7 according to an example embodiment of the invention, as shown in FIG. 2c, it is also possible that the object code pattern 7 comprises two or more conductive parts 11a, 11b that are electrically connected through the non-conductive part 17 but said two or more conductive parts 11a, 11b are not electrically connected to each other.

In the object code pattern 7 the conductive part 11a-11d can be made of any electrically conductive material including metal, conductive ink, conductive stich, conductive thread, conductive nano thread, etc. The non-conductive material can also be embroidered with conductive threads to form the object code pattern 7. By printing conductive ink on the surface of the non-conductive material can also form the surface A of the object code pattern 7.

Figure 3:
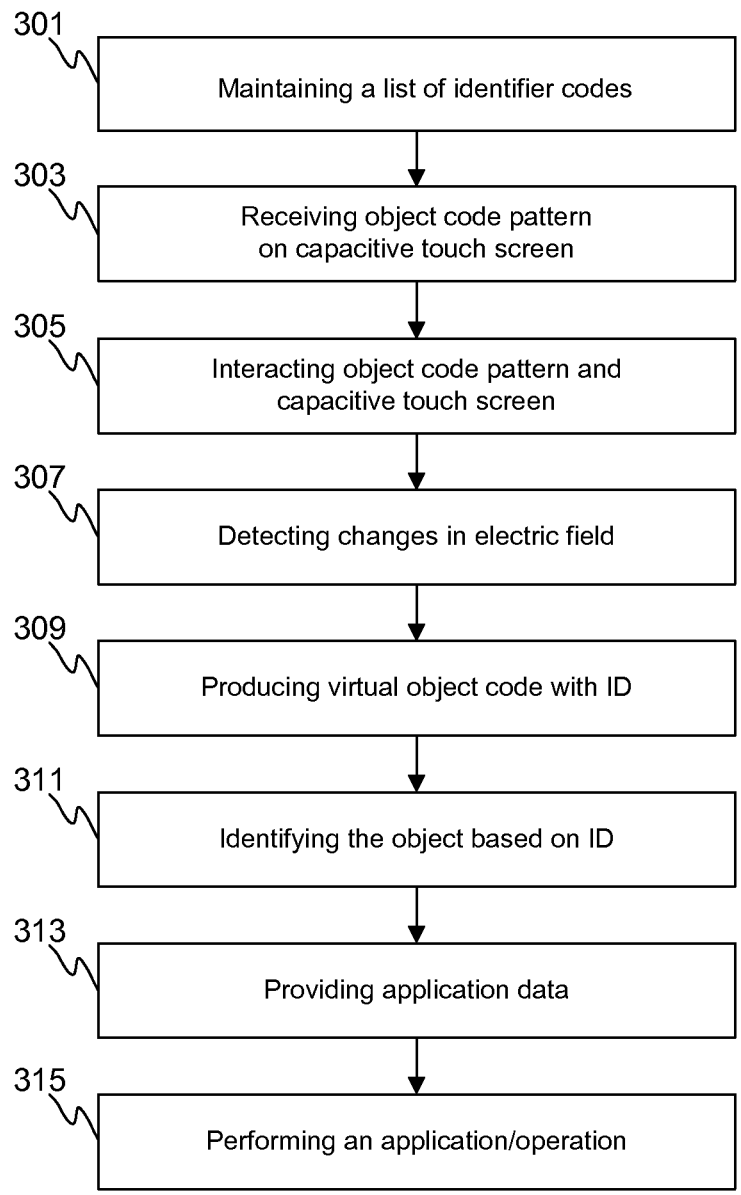
FIG. 3 illustrates a flow chart an example of a method according to the aspects of the disclosed embodiments.

FIG. 3 is a flow chart according to an example embodiment of the invention. According to step 303 a capacitive touch screen receives an object code pattern that is associated with an object and comprises at least on conductive part. Upon receiving the object code pattern the capacitive touch screen and the object code pattern are facing each other. In step 305 the conductive part of the object code pattern interacts with the capacitive touch screen within an area of the capacitive touch screen that is covered by the conductive part. The interaction between the conductive part and the capacitive touch screen causes an electric field to change in said area of the capacitive touch screen. The changes of the electric field in the capacitive touch screen are detected in step 307. Based on said changes the computer program being stored in the memory of the apparatus calculates by means of the processor a virtual object code for the object. In step 309 the virtual object code is produced. The virtual object code comprises at least an identifier code that relates to the object. The individual object is recognized in step 311 by comparing the identified identifier code to a list of identifier codes which is maintained for objects by the service provider, for example.

Based on the identified object application data being associated with the identified object is provided in step 313. This application data may be part of the virtual object and therefore it originates from the object code pattern being received by the capacitive touch screen. In this case the virtual object code comprises at least the identifier code and application data provided for the object being identified by the identifier code. On the other hand this application data may be stored in the memory of the apparatus in the external databases where the computer program may have access to retrieve stored data items. In this case the virtual object code comprises at least the identifier code and a pointer to a memory or database having application data provided for the object being identified by the identifier code. It is also possible that the virtual object code comprises at least the identifier code, some application data and a pointer for retrieving more application data provided for the object being identified by the identifier code.

In step 315 by means of the touch screen an application based on the provided application data is performed. The application can be, for example, accessing information, or providing further information, further content or new features for a certain computer program or enabling different use of current features in a certain computer program, or other such operations relating to the identified object. These operations are then performed using the capacitive touch screen.

In a method according to an example embodiment of the invention, upon receiving in step 303, the object code pattern that faces the capacitive touch screen further comprises a non-conductive part that surrounds the at least one conductive part. The conductive part is electrically connected through the non-conductive part to at least one conductive member: in this case another conductive part of the object code pattern. In an example, the object code pattern comprises two or more conductive parts where one conductive part is electrically connected through the non-conductive part to other conductive parts of the object code pattern. In step 305, it is the conductive parts that define the area of the capacitive touch screen in the range of which area the electric field changes during interaction between the object code pattern and the capacitive touch screen. The change of the electric field depends on the size and shape of the conductive parts in the object code pattern. In step 307, electric field changes in this area are detected and the computer program then produces the virtual object code based on the detected changes, respectively. The process described above allows the object code pattern to be placed in any position with respect to the capacitive touch screen. The process described above also allows the use of any type of known capacitive touch screen with any practicable display resolution. The virtual object code produced in step 309 can be, for example, binary code.

In a method according to an example embodiment of the invention the object code pattern has a predetermined shape comprising a plurality of conductive and non-conductive parts, said conductive parts being electrically connected to each other through the non-conductive part. Each of the plurality of conductive and non-conductive parts is surrounded at least by a strip of non-conductive part. In an example, the plurality of conductive and non-conductive parts forms a grid of squares.

In a method according to an example embodiment of the invention the conductive part is electrically connected through the non-conductive part to at least one conductive member which is a connection point to the object. In step 305, through this connection point behavior of the object code pattern can be changed. For example, conductivity and other electrical properties of the conductive parts can be controlled through the connection point. In an example, the user may touch by the finger the connection point so as to control conductivity of the object code pattern during the interaction between the object code pattern and the capacitive touch screen. For example, by touching the connection point the user's finger increase current flow towards the conductive parts and by raising his/her finger from the connection point current flow is reduced.

In a method according to an example embodiment of the invention the conductive part of the object code pattern is electrically connected to the connection point so as to receive pulsed signal within the area of the capacitive touch screen that interacts with the conductive part in step 305. In this case the interaction between the conductive parts of the object code pattern and the capacitive touch screen depends on time as well. The change of the electric field depends on time in addition to the size and shape of the at least one conductive part in the object code pattern. In this case at least partly the object code pattern being associated with the object comprises at least one of the following predetermined variables: number of pulses, length of pulses, pause between pulses and duration of the pulsed signal. In an example, an electronic circuit that supplies a signal being switched on and off according to a predetermined instructions can be led to the connection point of the object code pattern and ahead to the at least one conductive part so as to form the pulsed signal being received within the area of the capacitive touch screen that interacts with the conductive part in step 305. Since the change of the electric field is time-variant the detection step 307 is also time-variant, respectively. The virtual object code produced in step 309 comprises time-variant component and therefore it may include much more other data in addition to the identifier code than the virtual object code not having the time-variant component. The virtual object code produced in step 309 can be, for example, binary code.

In a method according to an example embodiment of the invention the object code pattern touches the capacitive touch screen in step 303. For example, if the object code pattern is attached at the bottom of the object the user slightly presses the object on its other side towards the surface of the capacitive touch screen so that the conductive parts of the object code pattern interact with the capacitive touch screen according to step 305. This interaction occurs independent of the position of the object code pattern on the surface of the capacitive touch screen.

In a method according to an example embodiment of the invention the object code pattern moves on the capacitive touch screen in step 303. For example, if the object code pattern is attached at the bottom of the object the user takes a grip of the object and slightly moves it on the surface of the capacitive touch screen so that the conductive parts of the object code pattern interact with the capacitive touch screen according to step 305. This interaction occurs independent of the movement direction of the object code pattern on the surface of the capacitive touch screen. Upon moving the object the user may slightly press, if necessary, the object towards the surface of the capacitive touch screen so that the conductive parts of the object code pattern interact with the capacitive touch screen.

In a method according to an example embodiment of the invention the user can place the capacitive touch screen on the object code pattern in step 303. It is not necessary that the object code pattern physically touches the capacitive touch screen in step 305. The electric field change may be detectable in step 307 even if there is a short distance between the capacitive touch screen and conductive parts of the object code pattern. However, if required the user may slightly press the surface of the capacitive touch screen towards the object code pattern and/or move the surface of the capacitive touch screen in relation to the object code pattern.

In a method according to an example embodiment of the invention the capacitive touch screen further comprises a material layer that protects the capacitive touch screen without interfering electric field properties. In step 305 during the interaction there is the protecting material layer between the capacitive touch screen and the conductive parts of the object code pattern.

In a method according to an example embodiment of the invention in step 313 the application data is provided with the object code pattern, retrieved from an internal memory or an external memory, e.g. a database server. Step 313 may comprise any combination of afore-mentioned data sources. For example, if the application data is provided with the object code pattern the application software can exploit the virtual object code being produced in step 309. In another example, part of the application data can be retrieved from the internal memory and another part of the application data can be retrieved form the external server. For example, the data source can be specified in the virtual object code by defining a pointer to the data source wherefrom application data can be retrieved. In general, the virtual object code comprises at least the identifier code to the individual object. In addition, the virtual object code may comprise the pointer to the data source wherefrom application data relating to this particular object can be retrieved. Further, the virtual object code may comprise application data relating to this particular object, as well.

In a method according to an example embodiment of the invention an application or operation relating to the individual object is performed using the touch screen according to step 315 and based on retrieved application data relating to the identified object in step 313. Performing the application/operation may comprise many options to mention few in the following: presenting information based on the application data, performing applications/operations based on retrieved application data, bringing new content to the current applications/operations, updating the current applications/operations with new features based on retrieved application data and using new features replacing current features relating to the object based on retrieved application data.

In a method according to an example embodiment of the invention a list of identifier codes is maintained in step 301. Each identifier code relates to the individual object and is the basis for identifying individual objects in step 311. For example, the list of identifier codes is maintained in the internal database. However, it can be partly or fully maintained in the external database.

An electronic apparatus 1 according to an example embodiment of the invention comprises at least a capacitive touch screen 2, a processor 3 and a memory 4. The memory 4 comprises a computer program so that the memory 4 and the computer program together with the processor 3 cause the apparatus 1 to perform operation steps defined in the method claims.

A computer program product according to an example embodiment of the invention comprises program code means for enabling a processor 3 to access an internal database 4 and/or external database arranged to store a plurality of data items associated with the individual object 5, information about which can be provided to the user of the apparatus 1 comprising the capacitive touch screen 2. The computer program comprises program code means adapted to perform operation steps defined in the method claims. In an example, the computer program product can be stored in the memory 4. In another example, the computer program product can be embodied in a computer readable medium such as a compact disc. In another example, the computer program product can be embodied in a signal transferred in a data communications network, e.g. Internet.

An arrangement according to an example embodiment of the invention, as shown in FIG. 1a, comprises (1) an apparatus 1 comprising a processor 3 and a memory 4 comprising a computer program, where the memory and the computer program together with the processor 4 cause the apparatus 1 to perform operation steps defined in any of the method claims, and (2) an object 5 comprising the object code pattern 7 for the object 5, comprising at least one conductive part 11 adapted to interact with the apparatus 1 that performs operation steps defined in any of the method claims and being adapted to interact with the apparatus 1 that performs operation steps defined in any of the method claims.

In an arrangement according to an example embodiment of the invention, as shown in FIG. 1b, the object 5 comprises a component 51 which is electrically connected, e.g. by a conductor 53, to an object connection point 55 which serves as an input/output of electric connections of the object 5. Through the object connection point 55 the component 51 is electrically connected to the connection point 15, 15a, 15b (as shown in FIGS. 2a-2c and 4a-4c) which serves as an input/output of electric connections of the object code pattern 7. For example, the object code pattern 7 is attached to the object 5 in such a way that the connection point 15, 15a, 15b and the object connection point 55 are electrically connected to each other. In an example, the component 51 is an electronic circuit or a piece of conductive material.

In an arrangement according to an example embodiment of the invention the object 5 comprises a component 51 which is an electronic circuit, e.g. a transistor, relay or other switching circuit. In an example, the electronic circuit is adapted to supply a pulsed signal to the conductive part 11 of the object code pattern 7. The time-variant pulsed signal is provided with the predetermined variables defined earlier in this application.

Preferably, the electronic circuit is electrically connected to the connection point 15 of the object code pattern 7 comprising one conductive part 11 so that the area of the capacitive touch screen 2 facing the conductive part 11 is adapted to receive the pulsed signal during the interaction between the conductive part 11 and the surface of the capacitive touch screen 2. The protective material layer with sufficiently high electric permittivity can be placed on the surface of the capacitive touch screen 2 without interfering with the interaction between the conductive part 11 and the capacitive touch screen 2.

In an arrangement according to an example embodiment of the invention the object 5 comprises a component 51 which is a piece of conductive material, e.g. a piece of metal. The piece of conductive material is electrically connected through the object connect point 55 to the connection point 15, 15a, 15b of the object code pattern 7 and thus to the conductive parts 11a-11d. In an example, the size and shape of the piece of conductive material should be such that it provides electric current to the conductive parts 11a-11d so that electric field changes is enabled in the area of the capacitive touch screen 2 that interact with the conductive parts 11a-11d of the object code pattern 7.

In an arrangement according to an example embodiment of the invention the object 5 comprises a receiving means 54 adapted to receive information based on detected changes in the capacitive touch screen 2. For example, the photo detector is adapted to sense light and changes in light transmitted by the capacitive touch screen. The computer program being stored in the memory 4 of the apparatus 1 and the memory 4 together with the processor 3 of the apparatus 1 cause the apparatus 1 to transmit information to the receiving means 54 of the object 5. Based on the received information the object 5 is adapted to perform predetermined operations/applications. Based on the received information the object 5 is also adapted to update information relating to it. Based on the received information the object 5 comprising a storing means (not shown in FIG. 1b) is also adapted to store information in its storing means.

According to an example of the invention a soft toy which comprises an object code pattern 7 comprising at least one conductive part 11, wherein the at least one conductive part 11 is adapted to interact with the apparatus that performs operation steps defined in any of the method claims. Preferably, the object code pattern 7 is attached to the bottom of the soft toy. In an example, the connection point 15 of the object code pattern 7 and the object connection point 55 of the soft toy are electrically connected. In another example, the soft toy comprises a piece of conductive material that is adapted to supply electric current as a signal to the conductive part 11 of the object code pattern 7. In another example, the soft toy comprises an electric circuit that is adapted to supply interrupted electric current as a pulsed signal to the conductive part 11 of the object code pattern 7. In another example, the soft toy comprises a receiving means 54 that is adapted to receive information based on detected changes in the capacitive touch screen 2.

Figure 4A:
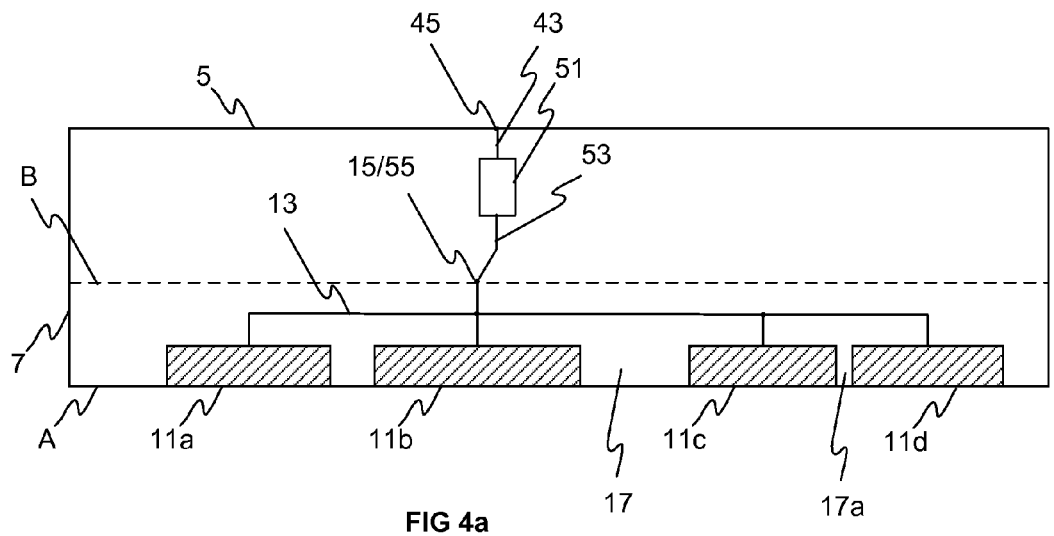
FIGS. 4a, 4b and 4c depict cross sectional view of an object comprising an object code pattern in an arrangement according to an example embodiment of the invention.
Figure 4B:
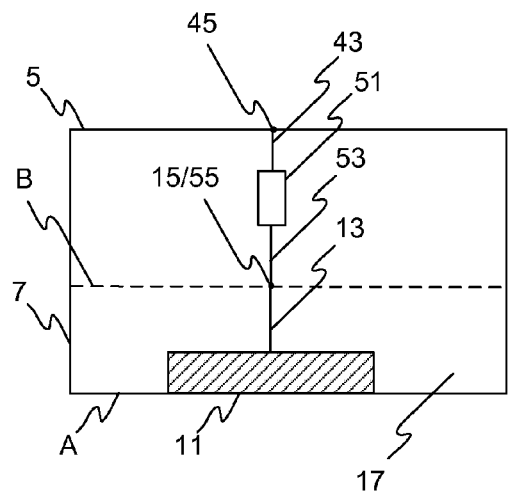

According to another example of the invention there is provided a use of a soft toy which comprises an object code pattern 7 comprising at least one conductive part 11 together with a capacitive touch screen 2 as earlier discussed to perform an application relating to the soft toy on the capacitive touch screen 2. FIGS. 4a and 4b depict cross sectional view of an object 5 comprising an object code pattern 7 in an arrangement according to an example embodiment of the invention. The object code pattern 7 is attached to the object 5 and line B illustrates the exemplary boundary surface between them. In an example, the object 5 and the object code pattern 7 may look like a unitary object. In another example, the object code pattern 7 is tightly fitted at the bottom of the object 5. The boundary surface line B can be invisible. The object 5 in general is made any non-conductive material, such as plastic, textile, wood or other suitable di-electric material.

Figure 4C:
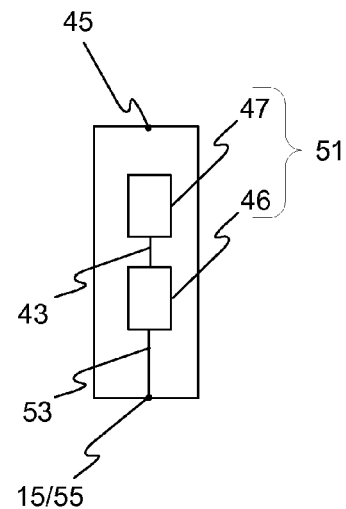

The object code pattern 7 of FIG. 4a comprises conductive parts 11a-11d and is similar to the object code pattern 7 as already described in connection of FIG. 2a and FIG. 2b. The object code pattern 7 of FIG. 4b comprises one conductive part 11 and is otherwise similar to the object code pattern 7 as already described in connection of FIG. 2c. The connection point 15 serves as an input/output of electric connections of the object code pattern 7. The object connection point 55 serves as an input/output of electric connections of the object 5. In an example, the object code pattern 7 is attached to the object 5 in such a way that the connection point 15 and the object connection point 55 are electrically connected to each other. Preferably, the aforementioned points form a joint connection point 15/55. The object 5 comprises a component 51 which is electrically connected to the connection point 15/55 e.g. by a conductor 53. Optionally, the component 51 may be electrically connected to an outer surface point 45 of the object 5, e.g. by a conductor 43. As shown in FIG. 4c, optionally, the component 51 comprises an electric circuit 46 or a piece of non-conductive material 47 or both of them two.

In an arrangement according to an example embodiment of the invention, as shown in FIG. 4a or 4b, the object 5 comprises the component 51 which is an electronic circuit 46 e.g. a transistor, relay or other switching circuit being electrically connected to the connection point 15/55. The electronic circuit 46 is adapted to supply a pulsed signal to the conductive part 11 of the object code pattern 7 as already discussed earlier in this application. The supply of the pulsed signal can be made more effective by electrically connecting the component 51, which in this case is the electronic circuit 46, to the outer surface point 45 of the object 5. Thus, the outer surface point 45 is attainable by the user's touch.

Alternatively, the object 5 comprises the component 51 which is a piece of conductive material 47, e.g. a piece of metal. In an example, the size and shape of the piece of conductive material should be such that the metal piece provides electric current that enable electric field changes without electrically connecting the piece of conductive material to the outer surface point 45 of the object 5. In another example, the size and shape of the metal piece can be defined using other criteria if it is electrically connected to the outer surface point 45. In this case electric field changes can be made more effective by providing electric current to the connection point 15/55 and consequently to the conductive parts 11a-11d by the user touching the outer surface point 45.

In an arrangement according to an example embodiment of the invention the object 5 comprises a component 51 which comprises an electronic circuit 46. The electronic circuit 46 is adapted to switch on and off the connection 13, 15, 53, 55, 15/55 between the conductive part 11, 11a-11d of the object code pattern 7 and the outer surface point 45 or any point on the conductor 43 between the electronic circuit 46 and the outer surface point 45. By switching on and off the connection 13, 15, 53, 55, 15/55 the capacitive properties of the conductive parts 11, 11a-11d are changed when the conductive parts 11, 11a-11d interact with the capacitive touch screen 2. In an example as shown in FIG. 4c, the component 51 in addition to the electronic circuit 46 further comprises a piece of conductive material 47 electrically connected between the electronic circuit 46 and a point on the conductor 43 between the electronic circuit 46 and the outer surface point 45. In this case, by switching on and off the connection 13, 15, 53, 55, 15/55 the piece of conductive material 47, that is able to provide and supply electric current, is connected and disconnected from the connection 15/55 and thus from the conductive parts 11, 11a-11d of the object code pattern 7. Alternatively, the piece of conductive material 47 can be electrically connected between the electronic circuit 46 and the outer surface point 45 so that electrical connection to the user's body is also attainable. Alternatively, the piece of conductive material 47 can be entirely replaced by the conductor 43 between the electronic circuit 51 and the outer surface point 45 as already earlier described. In the latter case electrical connection to the user's body is also attainable via the outer surface point 45.

All example embodiments described in connection of FIGS. 4a-4c are also applicable with example embodiments described earlier in connection of FIGS. 1a-1b and 2a-2c, and vice versa.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

The invention claimed is:

1. A method comprising:
  receiving by a capacitive touch screen an object code pattern associated with an object, said object code pattern comprising a physical pattern of a predetermined shape with at least one conductive part, so that, upon receiving, an electric field changes within an area of the capacitive touch screen that interacts with said at least one conductive part;
  electrically connecting the at least one conductive part of the object code pattern to a received pulsed signal within the area of the capacitive touch screen that interacts with the conductive part;
  detecting the predetermined shape of the object code pattern based on the changes in the electric field to produce a virtual object code comprising an identifier code relating to the object;
  recognizing the object by comparing the identifier code to a list of identifier codes;
  providing application data based on the object; and
  performing using the touch screen at least one application based on the application data,
  wherein the object code pattern faces the capacitive touch screen, and the at least one conductive part is electrically connected to at least one of another conductive part of the object code pattern, and a connection point to the object,
  the pulsed signal is supplied by an electronic circuit of the object connected to the connection point,
  the virtual object code further comprises a time-variant component based on the pulsed signal, and
  the identifier code comprises additional application data, which is used together with the application data to perform the at least one application.

2. The method according to claim 1, wherein the object code pattern that faces the capacitive touch screen further comprises a non-conductive part that surrounds the conductive part and through which the conductive part is electrically connected to at least one of the other conductive part of the object code pattern, and the connection point to the object.

3. The method according to claim 2, wherein the object code pattern has a predetermined shape comprising conductive and non-conductive parts, said conductive parts being electrically connected to each other.

4. The method according to claim 1, wherein said pulsed signal comprises at least one of predetermined variables, the predetermined variables including a number of pulses, a length of pulses, a pause between pulses and duration of said pulsed signal, said variables determining at least partly the object code pattern associated with the object.

5. The method according to claim 1, wherein receiving by the capacitive touch screen the object code pattern comprises one of the following:
the object code pattern touches the capacitive touch screen or approaches the capacitive touch screen to a certain distance,
the object code pattern moves on the capacitive touch screen, and
the capacitive touch screen touches the object code pattern or approaches the object code pattern to a certain distance.

6. The method according to claim 5, wherein a material layer that protects the capacitive touch screen without interfering electric field properties is disposed between the capacitive touch screen and the object code pattern.

7. The method according to claim 1, wherein performing the application comprises one or more of:
presenting information based on received application data,
performing applications based on received application data,
updating current applications using new features based on received application data, and
providing information to the object based on received application data.

8. The method according to claim 1, comprising maintaining a list of identifier codes, where each identifier code relates to the object.

9. An apparatus comprising:
a processor; and
a memory comprising a computer program, where the memory and the computer program together with the processor causing the apparatus to perform the method of claim 1.

10. A non-transitory computer-readable medium embodying a computer program comprising program code configured to cause a computer perform the method of claim 1, when said program is run on the computer.

11. An object code pattern for an object, comprising:
at least one conductive part configured to interact with the apparatus that performs the method of claim 1.

12. An arrangement comprising:
an apparatus comprising
a processor, and
a memory comprising a computer program,
the memory and the computer program together with the processor cause the apparatus to perform the method of claim 1; and
an object comprising an object code pattern including at least one conductive part configured to interact with the apparatus.

13. The arrangement according to claim 12, wherein the object further comprises a switching circuit electrically connected to the connection point of the object code pattern and configured to transmit the pulsed signal with predetermined variables to the conductive part of the object code pattern.

14. The arrangement according to claim 12, wherein the object further comprises a receiving means configured to receive information based on detected changes in the touch screen.

* * * * *